United States Patent
Pazdirek et al.

Patent Number: 5,609,433
Date of Patent: Mar. 11, 1997

[54] BALL JOINT LINK AND METHOD OF PRODUCING SAME

[75] Inventors: Jiri Pazdirek, Schaumburg; Ernst M. Gaertner, Wheeling, both of Ill.

[73] Assignee: Maclean-Fogg Company, Wheeling, Ill.

[21] Appl. No.: 509,806

[22] Filed: Aug. 1, 1995

[51] Int. Cl.$^6$ .................................................. F16C 11/06
[52] U.S. Cl. ........................... 403/140; 403/135; 403/122; 29/898.049; 264/273
[58] Field of Search ............................ 264/242, 273, 264/261, 262; 156/242, 245; 403/122, 130, 131, 132, 133, 135, 134, 140; 29/898.048, 898.049

[56] References Cited

U.S. PATENT DOCUMENTS

| | | |
|---|---|---|
| 1,909,430 | 5/1933 | Skillman . |
| 1,943,631 | 1/1934 | Skillman . |
| 2,027,560 | 1/1936 | Skillman . |
| 2,440,144 | 4/1948 | Hosking ......................... 264/273 X |
| 2,954,992 | 10/1960 | Baker . |
| 2,976,093 | 3/1961 | Reiling ........................... 264/273 X |
| 3,001,900 | 9/1961 | Frieder et al. ................. 264/273 X |
| 3,011,219 | 12/1961 | Williams . |
| 3,094,376 | 6/1963 | Thomas . |
| 3,559,265 | 2/1971 | Noris et al. ..................... 403/140 X |
| 3,591,669 | 7/1971 | Memory . |
| 3,650,004 | 3/1972 | Bergstrom ...................... 403/140 X |
| 3,941,495 | 3/1976 | Duncan . |
| 4,290,181 | 9/1981 | Jackson . |
| 4,342,799 | 8/1982 | Schwochert ................... 264/273 X |
| 4,439,909 | 4/1984 | Borgen et al. . |
| 4,629,352 | 12/1986 | Nemoto ............................ 403/135 |
| 4,722,631 | 2/1988 | Tagami ............................ 403/140 X |
| 4,797,019 | 1/1989 | Wood, Jr. ......................... 403/135 X |
| 4,887,486 | 12/1989 | Wood, Jr. . |
| 4,903,386 | 2/1990 | Teramachi ........................ 264/242 X |
| 4,973,372 | 11/1990 | Ditlinger . |
| 5,009,538 | 4/1991 | Shiral et al. . |
| 5,011,320 | 4/1991 | Love et al. . |
| 5,011,321 | 4/1991 | Kidokoro . |
| 5,061,110 | 10/1991 | Wood, Jr. ......................... 403/133 |
| 5,078,531 | 1/1992 | Sakai et al. . |
| 5,092,703 | 3/1992 | Kobayashi ....................... 403/122 |
| 5,140,869 | 8/1992 | Mrdjenovich et al. . |
| 5,150,981 | 9/1992 | Miwa . |
| 5,152,628 | 10/1992 | Broszat et al. . |
| 5,163,769 | 11/1992 | Dresselhouse . |
| 5,165,306 | 11/1992 | Hellon . |
| 5,178,482 | 1/1993 | Wood . |
| 5,267,805 | 12/1993 | Ueno et al. . |
| 5,277,860 | 1/1994 | Sinclair . |

FOREIGN PATENT DOCUMENTS

| | | |
|---|---|---|
| 0250063 | 12/1987 | European Pat. Off. . |
| 0411777 | 2/1991 | European Pat. Off. . |
| 2670255 | 6/1992 | France . |
| 59-062722 | 4/1984 | Japan . |
| 60-151414 | 8/1985 | Japan . |

*Primary Examiner*—Anthony Knight
*Attorney, Agent, or Firm*—Brinks Hofer Gilson & Lione

[57] ABSTRACT

A ball joint link includes a ball stud, a ball cap and a strengthening element that are all insert molded in a thermoplastic body. The strengthening element is disposed around the ball stud and includes a first portion which receives the ball of the ball stud and a second portion which receives the stud of the ball stud. The strengthening element is securely anchored in the body, and the second portion of the strengthening element resists pull out forces tending to remove the ball stud from the ball joint link. The ball cap snaps in place on the ball and is substantially completely embedded within the body. Insert molding methods for forming the ball joint link are disclosed.

18 Claims, 2 Drawing Sheets

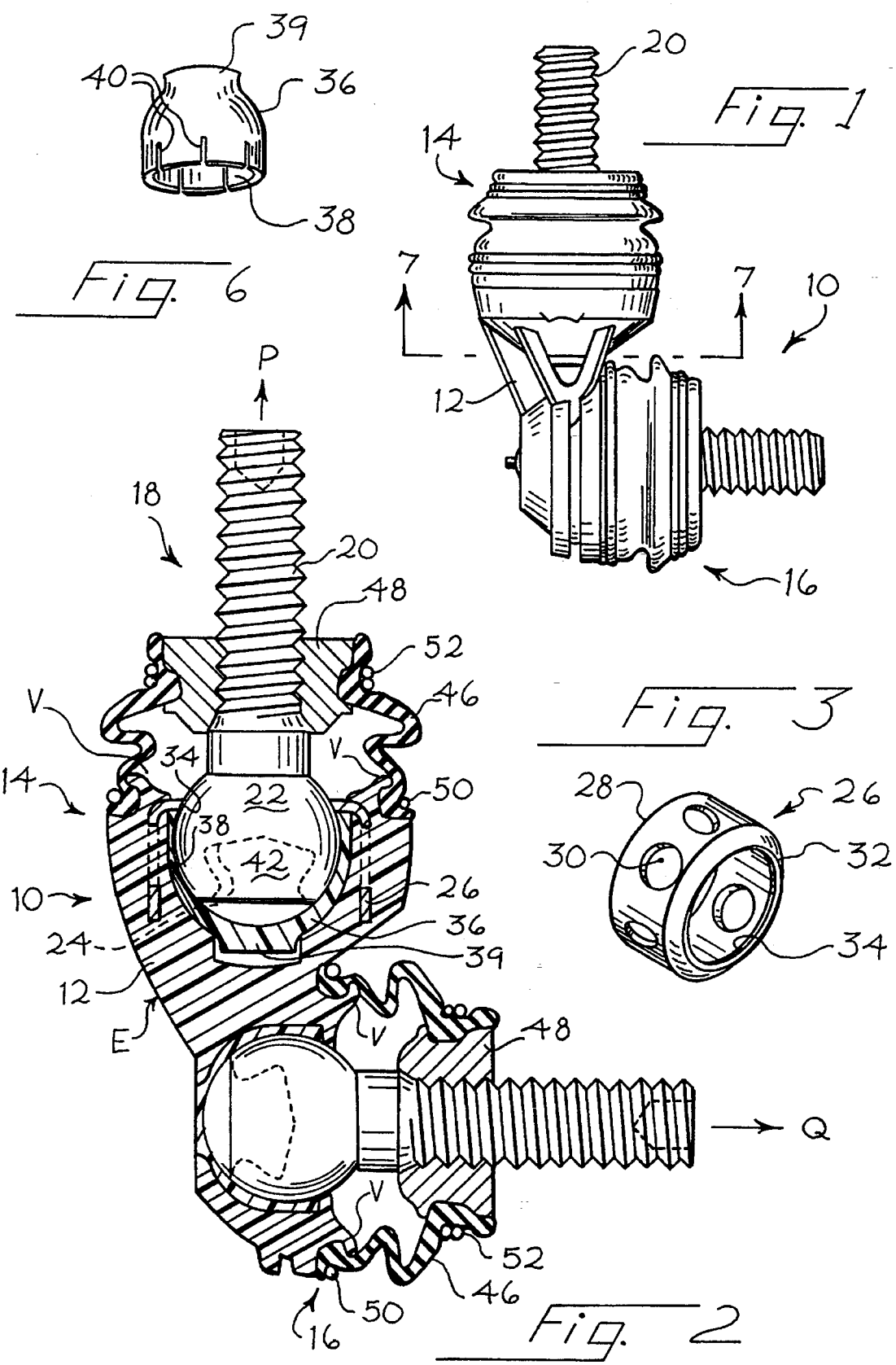

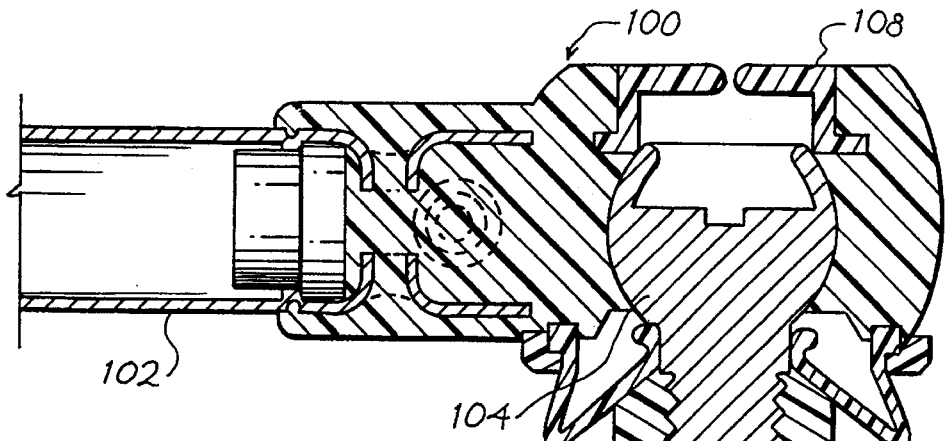
Fig. 8 (PRIOR ART)
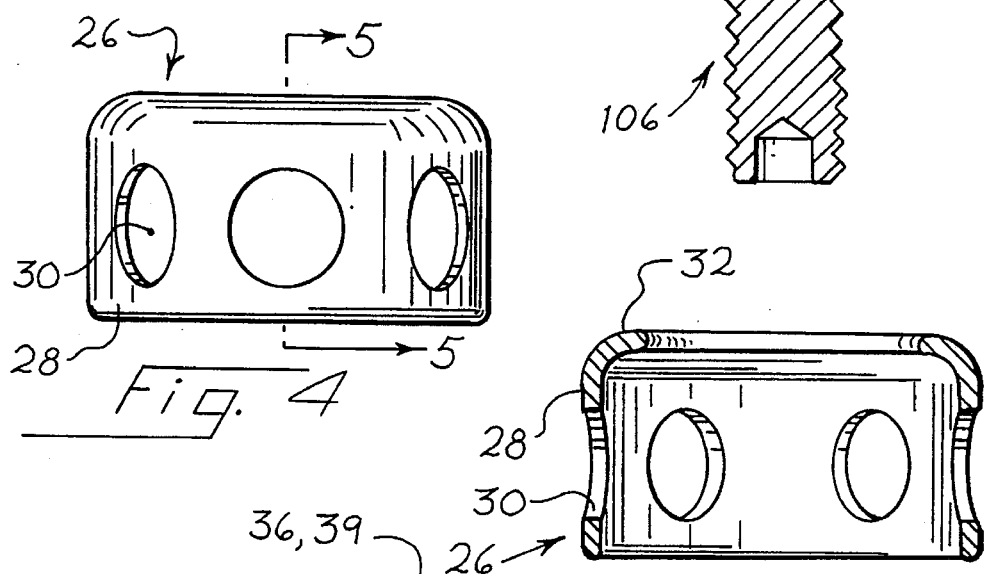
Fig. 4
Fig. 5
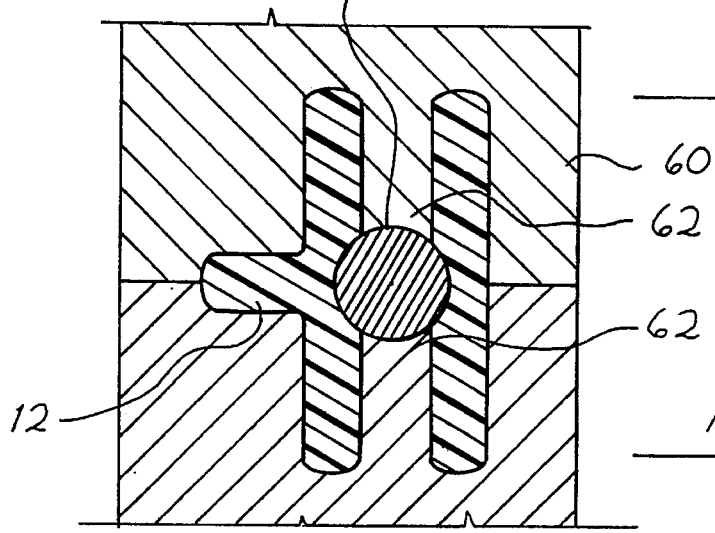
Fig. 7

BALL JOINT LINK AND METHOD OF PRODUCING SAME

BACKGROUND OF THE INVENTION

This invention relates to improved ball joint links that are light in weight and inexpensive to manufacture, and to methods for forming such links.

Molding techniques in the past have been used in the fabrication of various ball joint components. For example, Duncan U.S. Pat. No. 3,941,495 teaches a method for forming a ball around a stud to form a ball stud.

Sinclair U.S. Pat. No. 5,277,860 discloses an all-plastic rod end in which opposed raceways are mated to form a socket around a ball. The raceways are then overmolded to complete fabrication of the rod end.

Memory U.S. Pat. No. 3,591,669 discloses a plastic universal bearing which is molded in place in a link. In this case, the plastic that forms the socket of the ball joint is integral with the plastic that forms the center section of the link.

Hellon U.S. Patent Application Ser. No. 08/253,688, filed Jun. 3, 1994 and assigned to the assignee of the present invention, discloses an insert molded ball joint as shown in attached FIG. 8. The ball joint of Hellon includes a housing 100 which is insert molded around three separate parts: a tubular center section 102 of a ball joint link, a ball 104 of a ball stud 106, and a cap 108. A high-strength, fiber-reinforced plastic is used for the housing 100, and the same high-strength material that forms the housing 100 both secures the housing 100 to the center section 102 and forms the bearing surface for the ball 104. In this way, high pull out forces are required to dislodge the ball stud 106 from the housing 100.

The present invention differs significantly from the prior art of FIG. 8, particularly with respect to the manner in which the ball stud is retained in the ball joint, the manner in which the ball joint socket is formed, and the manner in which the ball joint is molded.

SUMMARY OF THE INVENTION

According to a first aspect of this invention, a ball joint link comprises a ball stud and a strengthening element. The ball stud comprises a stud which supports a ball, and the strengthening element is disposed around the ball stud. The strengthening element comprises a first portion sized to receive at least part of the ball. A molded body is formed around part of the ball to form a ball joint. This body is formed around at least part of the first portion of the strengthening element to hold the ball in the ball joint.

According to a second aspect of this invention, a ball joint link comprises a ball stud as described above and a cap forming a ball-receiving recess. The cap is mounted on the ball such that the recess receives the ball in a snap fit that retains the cap on the ball. A molded body is then formed around at least a portion of the cap to form a ball joint. The cap and the ball are insert molded in the body, and the cap can be formed of a material that provides an excellent bearing surface for the ball.

According to a third aspect of this invention, a method for forming a ball joint comprises the following steps. First, a ball stud and a strengthening element are positioned in a mold. The ball stud includes a stud which supports a ball, and the strengthening element comprises a first portion receiving at least part of the ball. Then a plastic material is injected into the mold around the strengthening element to form a ball joint, such that the ball and the strengthening element are insert molded in place in the ball joint.

According to a fourth aspect of this invention, a method for forming a ball joint comprises the following steps. First, a ball stud and a cap are positioned in a mold. The ball stud comprises a stud which supports a ball and the cap is supported in the mold in a desired relationship with respect to the ball. Then a plastic material is injected into the mold around the cap to form a body in which substantially all of the cap is embedded. The body, ball stud and cap form a ball joint.

The various aspects of this invention are preferably used together, as described in the following detailed description. However, it should be understood that individual aspects of this invention can be used independently of one another if desired.

BRIEF DESCRIPTION OF THE DRAWINGS

FIG. 1 is a side elevational view of a ball joint link which incorporates a presently preferred embodiment of this invention.

FIG. 2 is a cross-sectional view of the ball joint link of FIG. 1.

FIG. 3 is a perspective view of a strengthening element shown in FIG. 2.

FIG. 4 is a side view of the strengthening element of FIG. 3.

FIG. 5 is a cross-sectional view taken along line 5—5 of FIG. 4.

FIG. 6 is a perspective view of a ball cap shown in FIG. 2.

FIG. 7 is a cross-sectional view taken along line 7—7 of FIG. 1, showing portions of a mold used to form the body 12.

FIG. 8 is a cross-sectional view of a prior art ball joint.

DETAILED DESCRIPTION OF THE PREFERRED EMBODIMENTS

Turning now to the drawings, FIGS. 1 and 2 show two views of a ball joint link 10 which comprises a body 12 that forms two ball joints 14, 16. In this embodiment, the ball joints 14, 16 are oriented at right angles to one another. It should be understood that in general the ball joint link 10 can include one or more ball joints, and if multiple ball joints are provided, they can be oriented at any desired angle with respect to one another. For example, many ball joint links include two ball joints oriented with an included angle of 180° between the ball joints. The ball joint link 10 can, for example, be adapted for use with automotive suspension components, such as stabilizer bar links.

The ball joint 14 includes a ball stud 18 that includes a threaded stud 20 and a ball 22. Many arrangements are possible for the ball stud 18. For example, the ball 22 can be formed integrally with the stud 20, or the ball 22 can be molded in place on the stud 20. In this embodiment, the ball 22 defines a non-spherical surface 24 that forms a recess within the ball 22. Alternately, the end of the ball 22 opposite the stud 20 can be spherical in shape.

The ball 22 is surrounded by a strengthening element 26, which is shown in greater detail in FIGS. 3 through 5. The strengthening element 26 is a reinforcing element formed of a high-strength material such as a suitable steel. The strengthening element 26 includes a first portion 28 shaped as an annular flange that defines an array of through holes 30. The strengthening element 26 also includes a second portion 32 that extends radially inwardly from the first portion 28, and that defines an annular surface 34 shaped and positioned to bear on the ball 22. As best shown in FIG. 2, the diameter of the bearing surface 34 can be smaller than the diameter of the ball 22, such that the ball 22 is prevented from passing through the strengthening element 26. Alternately, the annular surface can be sized to allow the ball 22 to pass through the strengthening element 26.

As shown in FIGS. 2 and 6, a ball cap 36 is pivotably mounted on the ball 22. The ball cap 36 defines a bearing surface 38 that receives the ball 22. The bearing surface 38 forms a ball-receiving recess that defines a solid angle of at least about a hemisphere. As shown in FIG. 2, the bearing surface 38 extends more than half way around the ball 22, and the ball cap 36 is held in place on the ball 22 with a snap fit. If desired, slits 40 (FIG. 6) can be formed on the ball cap 36 to facilitate assembly of the ball cap 36 on the ball 22. The ball cap 36 can include an integral protrusion 39.

As best shown in FIG. 2, the ball cap 36 cooperates with the ball 22 to form a confined space 42 therebetween. This space 42 can be partially filed with a lubricant such as a suitable grease.

The ball joint 16 is similar to the ball joint 14 described above, except that the ball joint 16 does not include a strengthening element. In the illustrated embodiment, both of the ball joints 14, 16 are formed in a single insert molding operation.

As best shown in FIG. 2, each of the ball joints 14, 16 includes an elastomeric boot 46 and a threaded nut 48 received on the respective stud. Each of the boots 46 is secured to the housing 12 by a retaining ring 50 and to the respective nut 48 by a retaining ring 52. In the conventional manner, the region enclosed by the boot 46 can contain a lubricant such as a suitable grease.

The ball joint link 10 can be formed efficiently in an insert molding operation. First the ball studs are lubricated with a suitable grease that is held in place by the respective ball caps 36. The ball caps 36 snap in place on the respective balls, thereby retaining the grease in place and preventing plastic from entering the recess in the ball during the subsequent molding operation. Then the balls, the ball caps and the strengthening element 26 are positioned properly inside a mold cavity. Fixtures (not shown in FIG. 2) preferably position the strengthening element 26 into contact with the ball 22, as shown in FIG. 2. Alternately, the strengthening element 26 can be positioned by causing it to bear against the ball cap 36 or the mold surface.

As shown in FIG. 7, a mold 60 is used to form the body 12. This mold 60 comprises two protrusions 62 that are positioned to contact the ball cap 36. These protrusions 62 perform two functions: they form a stop for the ball stud/cap combination to locate this combination properly in the mold; and they prevent the ball cap 36 from moving away from the ball 22 (FIG. 2). In the preferred embodiment, the protrusion 39 of the ball cap 36 is captured between the protrusions 62 of the mold 60, thereby preventing undesired rotation of the ball cap 36 on the ball 22 during the molding operation. After the mold cavity is closed, thermoplastic material is injected into the mold cavity. This thermoplastic material substantially embeds the ball cap 36, and it fills the through holes 30 and the space on both sides of the first portion 28 in order to anchor the strengthening element 26 securely in place in the body 12.

Preferably, the thermoplastic material is a fiber-reinforced material, and the flow of thermoplastic material in the mold is arranged to enhance the strength of the resulting body 12. In this example, the thermoplastic material is injected into the mold near point E, and the mold is vented at various points V (FIG. 2). This tends to align the fibers in the thermoplastic material in a high-strength orientation. After the thermoplastic material has cooled the mold is opened and the remaining components of the ball joint link 10 are assembled. The protrusions 62 of the mold 60 leave indentations in the body 12 that extend laterally with respect to the stud 20 (FIG. 2).

Alternately, the ball cap 36 may be held in position by rods that extend laterally into the mold cavity (either transverse or at a predetermined angle to the axis of the stud). These rods (not shown) perform the same function as the protrusions 62, but they can be removed from the mold cavity during the molding operation to prevent the formation of indentations in the body 12.

Materials, dimensions, and details of construction can, of course, be varied to fit the specific application. The following details of construction are provided merely to define the presently preferred embodiment in greater detail, and are not intended to be limiting. The body 12 can be formed of a thermoplastic such as 30% glass reinforced 6/6 nylon. DuPont 70G33 has been found suitable. The strengthening element 26 can be formed of a material such as 1020 steel, having a wall thickness of about 0.090 inches. The ball caps 36 can be formed of an acetal material such as that sold under the tradename Delrin. The ball studs can be formed of 4140 steel, and the nuts and retaining rings can also be formed of suitable steel. The boots can be formed of urethane or rubber.

The ball joint link described above provides a number of important advantages. First, the strengthening element is securely anchored in the body, and the considerable hoop strength of the strengthening element provides a substantial increase in the strength of the ball joint link to resist pull out forces exerted in the direction P. High pull out force resistance is provided while allowing the use of a ball cap formed of a material that provides an excellent bearing surface, and while accommodating a wide angular range of motion for the ball stud.

Additionally, since the body 12 is insert molded around the major components of the ball joint, the assembly is light in weight and relatively inexpensive to manufacture. Since the end caps snap in place on the balls of the ball studs, the end caps are effectively retained in position on the balls during the molding operation.

In the intended application for the ball joint link 10, pull out forces along the direction P are anticipated to be substantially greater than pull out forces in the direction Q. For this reason, the ball joint 14 does not require a strengthening element 26 in this application. Of course, it will be understood that strengthening elements 26 can be provided on all of the ball joints of the ball joint link 10 if desired.

A wide range of changes and modifications can be made to the preferred embodiments described above. For example, the strengthening element 26 described above can be used without the ball cap 36. Additionally, materials and configurations can be adapted as appropriate for the particular application. Furthermore, it is not required that the first portion of the strengthening element be annular in configuration.

It is therefore intended that the foregoing detailed description be regarded as illustrative rather than limiting. It is the following claims, including all equivalents, which are intended to define the scope of this invention.

We claim:

1. A ball joint link comprising:

a ball stud comprising a stud which supports a ball;

a strengthening element disposed around the ball stud, said strengthening element comprising a first portion sized to receive at least part of the ball and a second portion extending radially inwardly from the first portion; and a molded body formed around at least a portion of the ball to form a ball joint and around at least a portion of the first portion of the strengthening element to hold the ball in the ball joint, said molded body comprising a fiber-reinforced material;

said first portion of the strengthening element at least partially molded in place and embedded in the molded body;

said strengthening element increasing resistance of the fiber-reinforced material of the molded body to pull out forces on the ball stud.

2. The invention of claim 1 wherein the second portion is sized to receive the stud but to prevent the ball from passing therethrough.

3. The invention of claim 2 wherein the second portion of the strengthening element comprises an annular surface positioned to bear against the ball.

4. The invention of claim 1 wherein the first portion of the strengthening element comprises an annular flange insert molded in the body.

5. The invention of claim 4 wherein the annular flange comprises a plurality of through holes, wherein the body comprises a thermoplastic material, and wherein the thermoplastic material extends into the through holes to anchor the strengthening element in the body.

6. The invention of claim 1 further comprising a cap mounted on the ball and insert molded in the body.

7. The invention of claim 6 wherein the cap defines a ball-receiving recess, and wherein the recess extends over a solid angle of at least about a hemisphere, thereby forming a bearing surface for the ball.

8. The invention of claim 7 wherein the cap encloses a space adjacent the ball, and wherein a lubricant is disposed in the space.

9. The invention of claim 6 wherein the cap is substantially completely embedded in the body.

10. The invention of claim 6 wherein the cap defines a ball-receiving recess, and wherein the recess receives the ball in a snap fit that retains the cap on the ball.

11. The invention of claim 1 wherein the body is secured to an additional element.

12. The invention of claim 11 wherein the additional element comprises an additional ball stud.

13. A method for forming a ball joint comprising the following steps:

(a) positioning a ball stud and a strengthening element in a mold, said ball stud comprising a stud which supports a ball, said strengthening element comprising a first portion at least partially receiving the ball and a second portion extending radially inwardly from the first portion; and (b) injecting a fiber-reinforced plastic material into the mold around the strengthening element to form a ball joint body such that the ball and the strengthening element are insert molded in place in the ball joint body, and the first portion of the strengthening element is at least partially embedded in the ball joint body;

said strengthening element increasing pull out resistance of the fiber-reinforced plastic material of the ball joint body.

14. The method of claim 13, wherein the strengthening element comprises a plurality of through holes, and wherein step (b) comprises the step of flowing the plastic material through the through holes.

15. The method of claim 13 wherein the ball stud comprises a cap mounted on the ball, and wherein step (b) insert molds the cap in the ball joint body.

16. A method for forming a ball joint comprising the following steps:

(a) positioning a ball stud and a ball cap in a mold, said ball stud comprising a stud which supports a ball, said ball cap snap fit on said ball, said mold supporting said ball cap opposite said ball stud to hold said ball cap in a desired relationship to the ball; and (b) injecting a plastic material into the mold around an exterior portion of the cap to form a body, said body, ball stud and cap forming a ball joint.

17. The method of claim 16 wherein said mold forms an indentation in the body adjacent a point on the ball cap where the ball cap was supported by the mold, said indentation extending laterally with respect to the stud.

18. The method of claim 17 wherein steps (a) and (b) form the indentation in the body on a side of the ball opposite the stud.

* * * * *